United States Patent [15] 3,656,595
Gethmann et al. [45] Apr. 18, 1972

[54] SEPARATE CLUTCH-BRAKE CONTROLS FOR BACKHOE

[72] Inventors: Kenneth W. Gethmann; Russell J. Dye, both of Route #1, Gladbrook, Iowa 50635

[22] Filed: Sept. 22, 1970

[21] Appl. No.: 74,460

Related U.S. Application Data

[62] Division of Ser. No. 744,797, July 15, 1968, Pat. No. 3,529,701.

[52] U.S. Cl. ............................................192/13 R, 192/83
[51] Int. Cl. ...................................F16d 67/04, B60k 29/02
[58] Field of Search......................192/13 A, 13, 83, 4 A, 4 R

[56] References Cited

UNITED STATES PATENTS

| 659,568 | 10/1900 | Bernardi | 192/13 X |
|---|---|---|---|
| 2,228,917 | 1/1941 | Walls | 192/83 X |
| 1,861,049 | 5/1932 | Cook | 192/13 |
| 2,085,550 | 6/1937 | Staude | 192/83 X |

Primary Examiner—Benjamin W. Wyche
Attorney—Zarley, McKee & Thomte

[57] ABSTRACT

A clutch and brake means for a backhoe adapted to permit the operator to disengage the clutch while simultaneously applying the backhoe brakes. The backhoe intake manifold is connected to a vacuum operated control means by means of a vacuum line in which is interposed a valve means. The vacuum operated control means includes a vacuum chamber having a diaphragm movably mounted therein which is connected to a rod extending therefrom. The rod has a spring means connected thereto which resists the movement of the rod in one direction when the valve is operated to apply a vacuum on the diaphragm. The rod is connected to a linkage which is connected to the clutch-brake pedal so that when a vacuum is applied to the diaphragm, the clutch is engaged while the brake is disengaged. When the vacuum is removed from the diaphragm, the spring means on the rod causes the rod to move the linkage so that the pedal is depressed thereby disengaging the clutch and applying the brakes on the backhoe.

5 Claims, 6 Drawing Figures

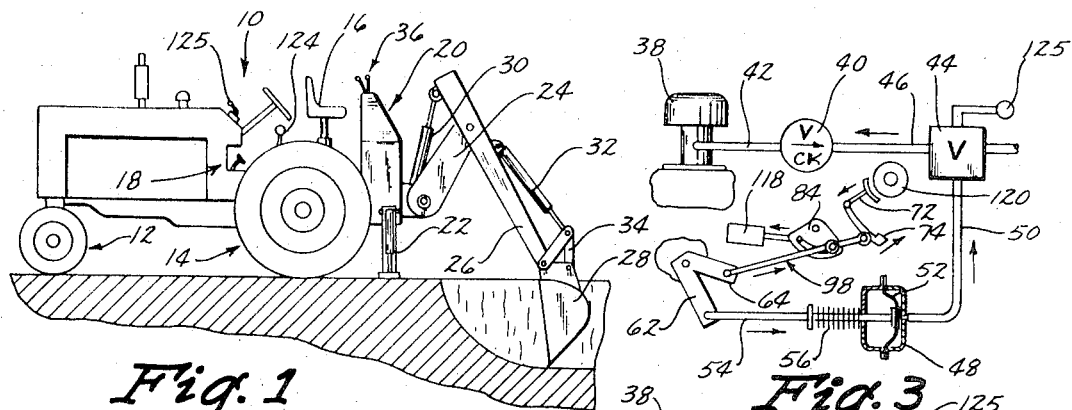
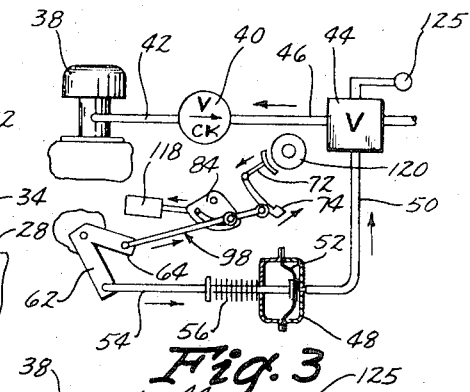
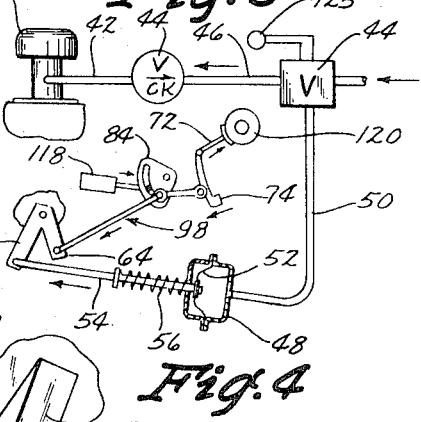
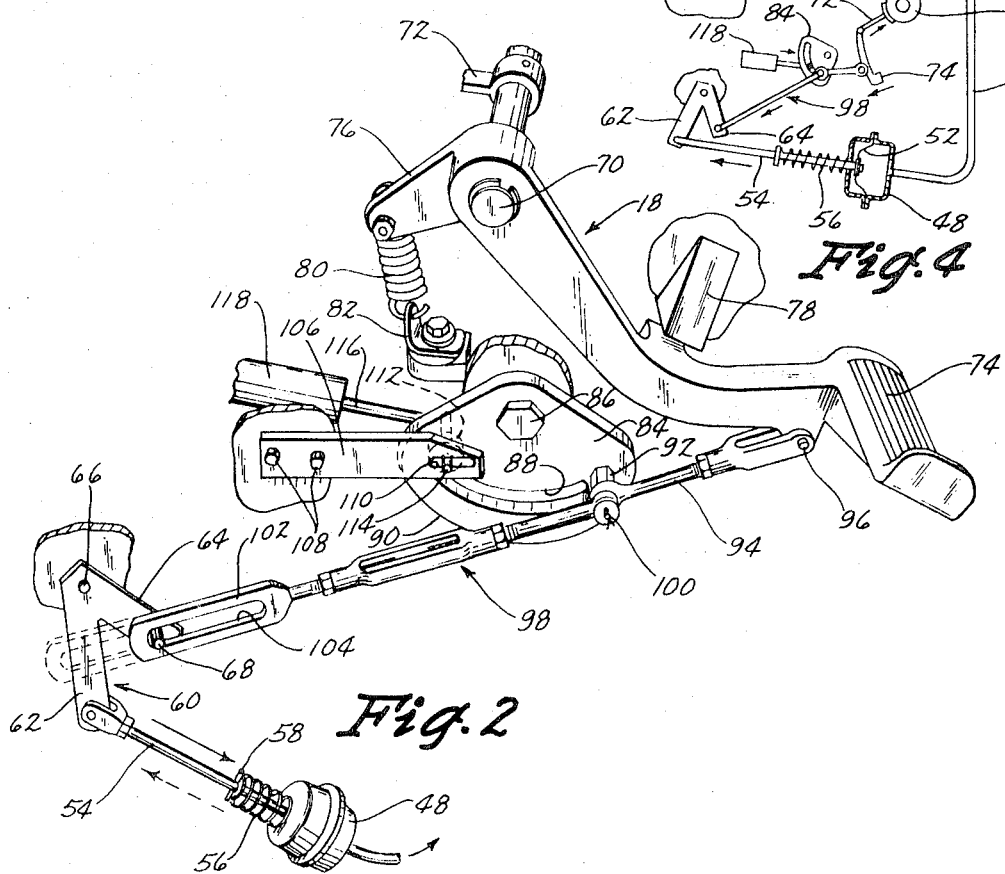

SEPARATE CLUTCH-BRAKE CONTROLS FOR BACKHOE

This is a divisional application of application Ser. No. 744,797 filed July 15, 1968, Now U.S. Pat. No. 3,529,701.

Backhoes are commonly mounted on the rearward end of a tractor or the like and generally include a boom which is pivotally mounted on the rear end of the tractor. A dipper stick is pivotally secured at one end to the rearward end of the boom and has a bucket pivotally secured at its other end. The boom, dipper stick and bucket are operated by a hydraulic cylinder means which is controlled from the backhoe operator station on the tractor. The backhoe operator station is reversed with respect to the normal operator station, that is, the backhoe operator faces rearwardly while the tractor operator normally faces forwardly. The backhoes are commonly provided with pivotal "outriggers" or stabilizer spreads which are lowered to the ground to provide stability to the unit.

A backhoe of the type described above is manufactured by the J. I. Case Company of Racine, Wisconsin and is designated as a Model 580 Construction King. The power train of the Model 580 has a four-speed sliding spur gear transmission which governs the speed of the tractor or vehicle. The Model 580 is also provided with an automatic power shuttle with torque converter which controls the direction of travel of the tractor. The power shuttle is only shiftable into either Forward or Reverse positions without any neutral position being provided. The Model 580 is provided with a left foot pedal which is a combination clutch-brake pedal in that the clutch controlling the gear transmission is disengaged and the brakes applied when the left pedal is depressed. Conversely, the tractor brakes are free or disengaged and the clutch is engaged when the left pedal is not in its depressed position. A pair of individual right pedals are also provided on the Model 580 to provide an additional steering assist when needed.

The gear transmission is positioned in neutral during normal backhoe operation and the power shuttle is positioned in either forward or reverse. The power shuttle will not cause the unit to move forwardly or rearwardly as long as the gear transmission is in a neutral position. If the backhoe operator wishes to move the backhoe forwardly or rearwardly, he must usually lower the operator's seat, rotate the seat to a forwardly facing position and then depress the clutch pedal. After depressing the clutch pedal, the gear transmission is shifted from neutral to one of its four speeds. The power shuttle is also shifted into the desired forward or rearward shift position. The clutch pedal is then released to cause the tractor to move to its desired position. After positioning the tractor, the operator must depress the clutch pedal and shift the gear transmission into neutral. The operator then rotates his operator's seat to a rearwardly facing position and raises the same to its proper height.

It can be seen that the above described operation is time consuming. As previously stated, the clutch-pedal on the Model 580 is normally extended so that the clutch is engaged and the brake disengaged. Thus, if the unit were on an incline, the unit could roll down the same during the time that the operator was: (1) lowering the seat; (2) rotating it to a forwardly facing position; and (3) depressing the clutch-brake pedal. This is true since the operator usually raises the outrigger from the ground and raises the dipper stick from the trench thereby permitting the tractor to be free to roll since the gear transmission is in a neutral position. The operator can only prevent the unit from rolling down the incline by leaving the dipper stick in engagement with the ground until the clutch brake pedal has been depressed and then attempting to reach the backhoe controls at the backhoe operator's station to raise the dipper stick. The reverse is also true when the unit has been moved and the operator attempts to lower the outriggers or boom before the unit begins its roll down the incline.

Thus it is a principal object of this invention to provide a clutch and brake control means for a backhoe.

A further object of this invention is to provide a clutch and brake control means for a backhoe which permits the operator to apply the backhoe brakes by means of a vacuum operated control means.

A further object of this invention is to provide a clutch and brake control means for a backhoe which permits the backhoe brakes to be applied from the backhoe operator's station.

A further object of this invention is to provide a clutch and brake control means for a backhoe which permits normal operation of the clutch means.

A further object of this invention is to provide a clutch and brake control means for a backhoe which eliminates the safety hazard now present in certain backhoes.

A further object of this invention is to provide a clutch and brake control means for a backhoe which is safe to use, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the backhoe;

FIG. 2 is a fragmentary perspective view of the linkage portion of the clutch and brake control means;

FIG. 3 is a schematic view of a portion of the clutch and brake control means illustrating the vacuum being applied to the diaphragm and wherein the clutch is engaged and the brake is disengaged;

FIG. 4 is a schematic view similar to FIG. 3 except that the vacuum has been removed from the diaphragm thereby causing the clutch to be disengaged and the brake to be engaged;

Figure 5:
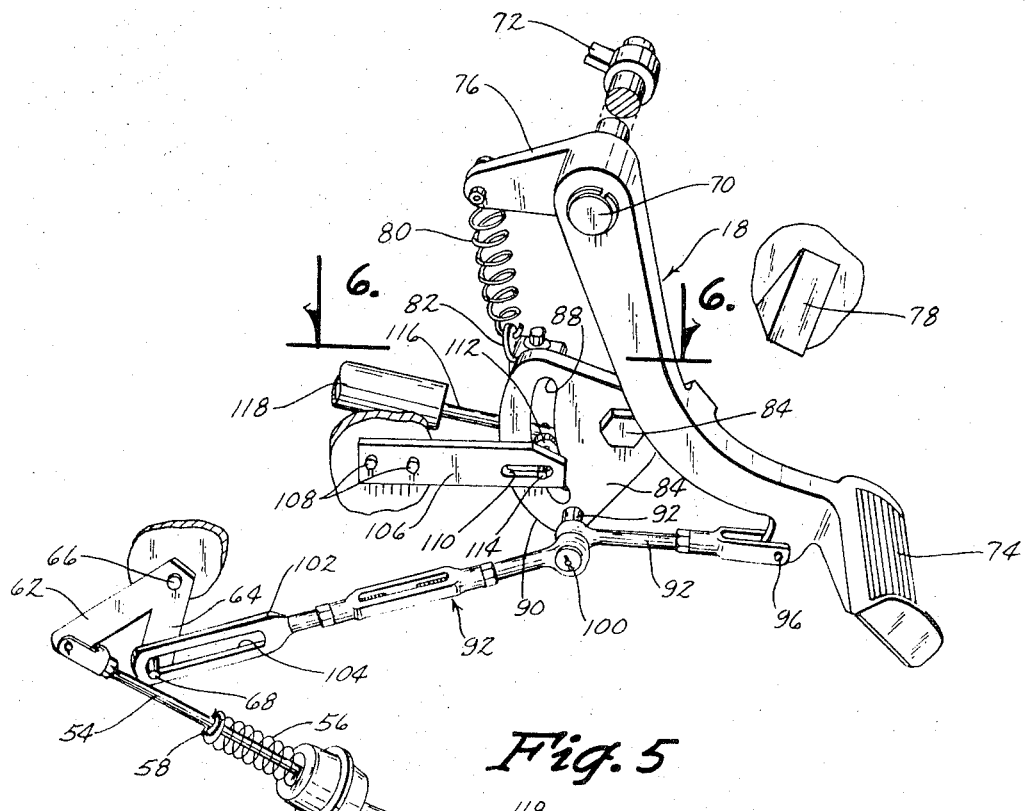
FIG. 5 is a view similar to FIG. 2 except that the clutch-brake pedal is illustrated in its depressed position.
Figure 6:
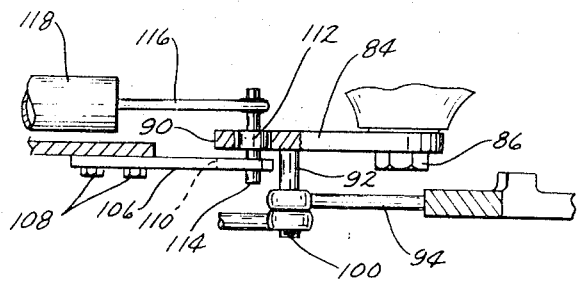
FIG. 6 is a partial view illustrating the relationship of the cam, cam follower bearing support and clutch valve linkage.

The numeral 10 generally designates a backhoe such as the Model 580 manufactured by the J. I. Case Company of Racine, Wisconsin. Backhoe 10 includes a front wheel means 12, rear wheel means 14, operator seat 16, clutch-brake pedal 18, tower 20 and outrigger means 22. A boom 24 is pivotally connected to the backhoe and extends rearwardly therefrom as seen in FIG. 1. A dipper stick 26 is pivotally connected to the rearward end of boom 24 and has a bucket 28 pivotally connected to the rearward ends thereof. Boom 24 is operated by a hydraulic cylinder means 30 while dipper stick 26 is operated by a hydraulic cylinder means 32. Bucket 28 is operated by a hydraulic cylinder means 34. A control means 36 is provided on the tower 20 to control the operation of the boom 24, dipper stick 26 and boom 28.

The numeral 38 generally designates the intake manifold of the backhoe which is connected to a check valve 40 by a vacuum line 42. Check valve 40 is connected to a valve 44 by a vacuum line 46. As indicated in FIGS. 3 and 4, check valve 40 is designed so that a vacuum will exist between the check valve 40 and the valve 44 even though the backhoe motor is not being operated to create a vacuum at the intake manifold 38. Valve 44 is of the through type having an exhaust open to the atmosphere on the downstream side thereof and is movable from the open position seen in FIG. 3 to the closed position seen in FIG. 4. Valve 44 is connected to a vacuum cylinder 48 by means of a vacuum line 50. Vacuum cylinder 48 has a diaphragm 52 movably mounted in the interior thereof to which a rod 54 is connected. As seen in FIG. 3, rod 54 extends outwardly through the cylinder 48 and has a spring means 56 mounted thereon which resists the movement of the diaphragm from the position of FIG. 4 to the position of FIG. 3 when a vacuum is applied to the diaphragm 52. Rod 54 has a pin 58 extending therethrough which serves as a stop for the spring means 56.

The other end of rod 54 is pivotally connected to a linkage means 60 including angularly disposed arms 62 and 64 which are rigidly secured together by means of a bolt 66 extending therethrough in the manner seen in FIG. 2. Bolt 66 is received by a suitable opening in the frame of the backhoe in a manner so as to permit the pivotal movement of the linkage 60 with respect thereto. A pin 68 is secured to the free end of angularly disposed arms 64 and extends outwardly therefrom as seen in FIG. 2.

Pedal 18 is rigidly connected to a shaft 70 by any suitable means so that the movement of the pedal 18 will cause shaft 70 to be rotated. Shaft 70 is operatively connected to the backhoe brakes by means of a linkage means generally designated by the reference numeral 72. Pedal 18 is provided with a foot portion 74 at one end thereof and an arm member 76 extending forwardly and downwardly from the other end thereof as illustrated in FIG. 2. A stop 78 is provided on the backhoe in the pivotal path of pedal 18 and is designed to limit the pivotal movement of the pedal 18 in one direction. A spring means 80 is secured to the forward end of arm member 76 and is secured to the backhoe frame by means of a bracket 82 to yieldably resist the depressing of the pedal 18.

A cam 84 is pivotally mounted on a cam pivot shaft 86 which is connected to a suitable supporting means such as the backhoe frame or the like. Cam 84 has an elongated arcuate cam track 88 formed therein adjacent its lower edge 90. A post 92 extends laterally from cam 84 adjacent the rearward end of cam track 88 and has a link 94 pivotally mounted thereon which is pivotally secured to pedal 18 by pin 96 as illustrated in FIG. 2. A turnbuckle assembly 98 is pivotally received at one end thereof on the post 92 and is secured thereto by means of a key 100. The other end of turnbuckle assembly 98 is provided with an elongated, flat portion 102 having a longitudinal slot 104 formed therein which receives the pin 68. The numeral 106 generally designates a cam follower bearing support which is secured to the backhoe frame by bolts 108 and which has a longitudinal slot 110 formed therein adjacent its rearward end. A cam follower bearing 112 is mounted in cam track 88 and has a pin portion 114 extending through slot 110. The other end of cam follower bearing 112 is operatively connected to one end of flow spool 116 which is connected to the clutch valve 118 which controls the operation of the clutch to engage and disengage the same. The numeral 120 generally designates the backhoe brake which brakes the rear wheel means 14 and is depicted in schematic form in FIGS. 3 and 4.

In normal backhoe operation with this invention, the gear transmission may be in neutral or any of its four speed positions as indicated by the shift lever 124 while the power shuttle shift lever 125 would be positioned in either forward or reverse. Without this invention, the gear transmission would have to be positioned in neutral. As previously stated, the unit will not be moved either forwardly or rearwardly by the power shuttle as long as the gear transmission means is in neutral. The valve means 44 would also have been operated during the normal digging operation so that no vacuum was imposed on the diaphragm 52. When there is no vacuum on the diaphragm 52, the spring means 56 will cause the rod 54 to be moved outwardly with respect to cylinder 48 thereby causing linkage means 60 to pivot about bolt 66 in a clock-wise manner as viewed in FIG. 2. Such clock-wise pivotal movement of the linkage means 60 causes the pin 68 to engage the rearward end of the slot 104 and to move the turnbuckle means 98 forwardly to the position illustrated by broken lines in FIG. 5. The forward movement of the turnbuckle means 98 causes the cam 84 to move along the cam track 88 thereby causing the flow spool 116 to disengage the gear transmission clutch. The forward movement of the turnbuckle means 98 also causes the pedal 18 to be depressed due to the connection therewith which causes the rotation of shaft 70 thereby causing the linkage 72 to apply the brakes on the rear wheel means 14. The operator can then turn the operator seat to a rearwardly facing position, lower the outriggers and commence the digging operation. When the operator desires to move the unit along the length of the trench, the outriggers may be raised and the dipper stick may be raised from the trench without fear of the unit rolling down an incline inasmuch as the pedal 18 is depressed thereby applying the vehicle brakes. The operator can then rotate the operator's seat to a forwardly facing position, operate the valve means 44 to create a vacuum on the cylinder 48. When vacuum is imposed on the diaphragm 52 in cylinder 48, the rod 54 will be moved inwardly with respect to the cylinder 48 thereby causing the linkage means 60 to pivot about bolt 66 in a counter-clock-wise manner as viewed in FIG. 2. Such counter-clock-wise pivotal movement of the linkage means 60 would cause pedal 18 to be released from its depressed condition. The operator may then operate the pedal 18, the power shuttle and the gear transmission as desired to move the unit to its desired location. The operator could also move the unit along the length of the trench from the backhoe operator's seat by one of two methods if desired. One method of moving the unit for short distances is to pivotally move the dipper stick 26 and boom 24 while the bucket 28 is in a ground engaging position which would thereby push the tractor forwardly or pull the tractor rearwardly. The above described method is good for short distances but is not satisfactory where the distance to be traversed is substantial and wherein the ground is soft so that the front wheels of the vehicle would sink into the ground. A second method of moving the unit along the length of the trench while remaining on the backhoe operator's seat is to have previously shifted the power shuttle into either forward or reverse and to have shifted the gear transmission into any of its four speeds. As previously stated, the pedal 18 is depressed during normal backhoe operation since vacuum is not imposed on the cylinder 48. When the backhoe operator desires to move the vehicle along the trench, he may operate valve 44 to cause a vacuum to be imposed upon the diaphragm 52 thereby permitting the pedal 18 to move from its depressed position to its extended position which will cause the clutch of the gear transmission to be engaged thereby propelling the vehicle in either a forwardly or rearwardly direction in any one of its four speeds. When the vehicle has been moved to its desired location, the backhoe operator simply operates control valve 44 to brake the vacuum on the cylinder 48 thereby causing the pedal 18 to be again depressed which disengages the gear transmission clutch and which engages the vehicle brakes.

When the tractor is being used for purposes other than backhoe operations, the control valve 44 is operated to impose a vacuum on the diaphragm 52. The elongated slot 104 in the turnbuckle means 98 permits the normal operation of the pedal 18.

While the brake and control means has been designated herein as being especially well adapted for use with the Model 580, it can be appreciated that the system can be adapted for use with other backhoes. The control means described herein insures that the vehicle brakes will be applied so as to eliminate any possibility of the backhoe rolling down an incline. It has been found that the spring means 56 should be designed so as to exert 80 to 90 pounds of pressure on the linkage means 60 which increases the pressure to an average of approximately 175 pounds at the pedal 18. Such pressure insures that the brake will be positively set on the backhoe.

Thus it can be seen that the brake and control means accomplishes at least all of its stated objectives.

We claim:
1. In combination,
   a vehicle having an engine, a brake means, and a brake pedal which engages the brake means when depressed,
   a first valve means operatively connected to the intake manifold vacuum of the engine, a manual actuator connected to said first valve means and having no operative connection with said pedal,
   a vacuum housing having a diaphragm movably mounted therein,
   said housing being operatively connected to said first valve means whereby said valve can be operated by said actuator to create a vacuum in said housing thereby moving said diaphragm in one direction in said housing, a rod means extending into said housing and being secured at one end to said diaphragm and being movable therewith, a spring means connected to said rod means and yieldably resisting the movement of said rod means and diaphragm in said one direction, the other end of said rod means being pivotally connected to a pivotal linkage means, said pivotal linkage means being connected to a link means which is connected to the brake pedal, said spring means moving said rod means in a direction opposite to said one direction when said first valve means is manually operated to release the vacuum is said housing, the movement of said rod means in said opposite direction causing the pivotal movement of said linkage means and causing said link means to depress said brake pedal to engage the brake means, the operation of said first valve means causing said brake pedal to be depressed by said spring means without the operator physically moving the pedal so that the operator can cause said brake pedal to be depressed from a position remote therefrom, said link means being comprised of a first link arm connected at one end to said pivotal linkage means and pivotally connected at its other end to a pivotal cam plate and a second link arm pivotally connecting said cam plate and said brake pedal, said cam plate being operatively connected to the vehicle clutch whereby the depressing of said brake pedal engages said brake means and disengages the vehicle clutch, said first link arm having an elongated slot formed therein which slidably receives a pin means extending from said pivotal linkage whereby said pedal can be depressed without pivotally moving said pivotal linkage means.

2. The combination of claim 1 wherein said pivotal linkage means is comprised of a substantially inverted V-shaped member pivotally movable about its upper end, said rod means being pivotally connected to one of the legs of the V-shaped member at the lower end thereof, said pin means extending from the lower end of the other leg of the V-shaped member.

3. The combination of claim 1 wherein said first link arm is length adjustable.

4. In combination, a vehicle having an engine, a clutch means, a brake means, and a clutch-brake pedal which causes the engagement of the brake means and the disengagement of the clutch means when depressed, a first valve means operatively connected to the intake manifold vacuum of the engine, a manual actuator connected to the said first valve means and having no operative connection with said clutch-brake pedal, a vacuum housing having a diaphragm movably mounted therein, said housing being operatively connected to said first valve means whereby said valve can be operated by said actuator to create a vacuum in said housing thereby moving said diaphragm in one direction in said housing, a rod means extending into said housing and being secured at one end to said diaphragm and being movable therewith, a spring means connected to said rod means and yieldably resisting the movement of said rod means and diaphragm in said one direction, linkage means operatively connecting the other end of said rod means and said clutch-brake pedal, said spring means moving said rod means in a direction opposite to said one direction when said first valve means is manually operated to release the vacuum in said housing, the movement of said rod means in said opposite direction causing said linkage means to depress said clutch-brake pedal to engage the brake means and disengage the clutch means, the manual operation of said first valve means by said actuator causing said clutch-brake pedal to be depressed by said spring means without the operator physically moving the pedal so that the operator can cause said pedal to be depressed from a position remote therefrom.

5. The combination of claim 4 wherein said vehicle includes an operator's station which faces forwardly with respect to the vehicle and includes a backhoe operator's station which faces rearwardly with respect to the vehicle, said clutch-brake pedal being positioned at said operator's station, said actuator being positioned at said backhoe operator's station so that said clutch-brake pedal can be controlled by said first valve means from said backhoe operator's station.

* * * * *